United States Patent
Kayumi et al.

(10) Patent No.: US 6,869,121 B2
(45) Date of Patent: Mar. 22, 2005

(54) SEAT STRUCTURE FOR VEHICLE

(75) Inventors: Tetsuya Kayumi, Kawachi-gun (JP);
Osamu Shirose, Utsunomiya (JP);
Shinsuke Watanabe, Utsunomiya (JP);
Yoshinori Nakamura, Utsunomiya (JP); Ohsuke Koike, Toda (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/663,622

(22) Filed: Sep. 16, 2003

(65) Prior Publication Data

US 2004/0056500 A1 Mar. 25, 2004

(30) Foreign Application Priority Data

Sep. 19, 2002 (JP) ........................................ 2002-273350

(51) Int. Cl.[7] .................................................. B60N 3/12
(52) U.S. Cl. ............................. 296/37.15; 297/188.01; 297/188.1; 296/37.16
(58) Field of Search ................................ 296/37.15, 63, 296/65.01, 65.05, 37.8; 297/250.1, 232, 257, 288.1, 188.09, 188.08; 224/275, 277

(56) References Cited

U.S. PATENT DOCUMENTS

| | | | | | |
|---|---|---|---|---|---|
| 5,902,009 | A | * | 5/1999 | Singh et al. ............. | 296/37.15 |
| 5,947,541 | A | * | 9/1999 | Behrens et al. ............ | 296/63 |
| 5,951,084 | A | * | 9/1999 | Okazaki et al. ........... | 296/37.16 |
| 5,997,083 | A | * | 12/1999 | Ono et al. .................. | 297/237 |
| 6,027,164 | A | * | 2/2000 | Jakubiec et al. ......... | 297/188.01 |
| 6,203,088 | B1 | * | 3/2001 | Fernandez et al. ........ | 296/37.15 |
| 6,367,857 | B2 | * | 4/2002 | Kifer et al. ................. | 296/37.8 |
| 6,375,255 | B1 | * | 4/2002 | Maruta et al. ............ | 296/65.01 |
| 6,386,612 | B2 | * | 5/2002 | Hofmann et al. ......... | 296/37.15 |
| 6,386,629 | B1 | * | 5/2002 | Severinski et al. ....... | 297/188.1 |
| 6,419,313 | B1 | * | 7/2002 | Newman ................... | 296/37.15 |
| 6,488,327 | B1 | * | 12/2002 | Pearse et al. ............. | 296/37.15 |
| 6,540,279 | B1 | * | 4/2003 | Bargiel ..................... | 296/37.15 |
| 6,644,523 | B1 | * | 11/2003 | Salas ........................ | 296/37.15 |
| 6,676,216 | B1 | * | 1/2004 | Freijy et al. .............. | 296/65.09 |
| 6,773,059 | B2 | * | 8/2004 | Volotsenko ............. | 297/188.01 |
| 2004/0155494 | A1 | * | 8/2004 | Mizuno et al. ......... | 297/188.09 |

FOREIGN PATENT DOCUMENTS

JP 02-220936 9/1990

* cited by examiner

*Primary Examiner*—Kiran Patel
(74) *Attorney, Agent, or Firm*—Merchant & Gould P.C.

(57) ABSTRACT

A seat structure for a vehicle which includes a pair of side seats disposed at right and left sides of the vehicle; a center seat disposed between the pair of side seats, the center seat including a seat cushion which includes a front divided member and a rear divided member; and a first box container having an open top. The first box container may be formed, when the front divided member is moved in a front direction, by a surface of the front divided member, a front surface of the rear divided member, and a side surface of a seat cushion of each of the pair of side seats facing towards the center seat.

6 Claims, 16 Drawing Sheets

SEAT STRUCTURE FOR VEHICLE

BACKGROUND OF THE INVENTION

1. Field of the Invention

The present invention relates to a seat structure for a vehicle.

2. Description of Related Art

As examples of a technique relating to a seat structure for a vehicle, it has been known to make a center portion of a seat cushion to be separable from the main body thereof so that a box-like container having a space which may be used for storing and/or placing articles, belongings, etc. (hereinafter also referred to simply as a box container) may be formed being surrounded by the rest of the seat cushion with its top portion being open. Also, it has been known to dispose a cover member at the opening portion of the box container so that it may be freely opened and closed as disclosed in Japanese Unexamined Patent Application, First Publication No. Hei 2-220936, for example.

However, if a box container with an open top is formed by removing a center portion of a seat cushion as described above, the center portion of the seat cushion must be removed every time the box container is formed to place belongings, etc., and this is very troublesome for the driver and the passengers of a vehicle. Also, there is a tendency for the size of the box container to be insufficient since the space is substantially formed by the rest of the seat cushion from which a part of the center portion is removed.

SUMMARY OF THE INVENTION

Accordingly, an object of the invention is to provide a seat structure for a vehicle which enables readily forming a box container (i.e., a box-like space which may be used for storing, placing, etc., articles, belongings, and so forth) and to increase the size of the box container.

In order to achieve the above object, a first aspect of the present invention provides a seat structure for a vehicle including: a pair of side seats (for instance, side seats 11, explained in the following embodiment) disposed at right and left sides of the vehicle; a center seat (for instance, a center seat 16, explained in the following embodiment) disposed between the pair of side seats, the center seat including a seat cushion (for instance, a seat cushion 17, explained in the following embodiment) which comprises a front divided member (for instance, a front divided member 34, explained in the following embodiment) and a rear divided member (for instance, a rear divided member 35, explained in the following embodiment); and a first box container (for instance, a first box container 64, explained in the following embodiment) which is formed when the front divided member is moved in a front direction, by a surface (for instance, a rear surface 55, explained in the following embodiment) of the front divided member, a front surface (for instance, a front surface 38, explained in the following embodiment) of the rear divided member, and a side surface of a seat cushion (for instance, a seat cushion 12, explained in the following embodiment) of each of the pair of side seats facing the center seat.

Note that the front divided member of the seat cushion of the center seat may be moved in the forward direction by, for example, rotating around the front end portion thereof or sliding in a horizontal direction.

According to the above seat structure for a vehicle, when the front divided member of the seat cushion of the center seat is moved in the forward direction, the box container having an opened top is formed by the rear surface of the front divided member, the front surface of the rear divided member, and the side surface of the seat cushion of each of the pair of side seats facing the center seat. Accordingly, it is only necessary to move the front divided member to form the box container, and it is not necessary to remove the seat cushion each time. Also, since the right and left side surfaces of the box container are formed by the side surface of each of the right and left side seats, it becomes possible to increase the width of the box container as compared to a case where the right and left side surfaces of the box container are formed by a part of the center seat.

A second aspect of the present invention provides a seat structure for a vehicle as set forth in the first aspect of the invention, wherein the front divided member is moved in a front direction by rotating around a front end side of the front divided member so as to be inverted upside down, and a first tray part (for instance, a tray part 57, explained in the following embodiment) is provided on an upper surface (for instance, an upper surface 56 explained in the following embodiment), after the inversion, of the front divided member.

According to the above seat structure for a vehicle of the second aspect of the invention, when the front divided member is rotated to form the box container, the front divided member is inverted so that the tray part is disposed on the upper surface thereof, and hence passengers sitting on the right and left side seats may use the front divided member of the center seat as a tray.

A third aspect of the present invention provides a seat structure for a vehicle as set forth in the second aspect of the invention, wherein the center seat is slidable in a backward direction within a range including a position where a front end portion of the first tray part after the inversion of the front divided member aligns with a front end portion of the pair of side seats.

According to the above seat structure for a vehicle of the third aspect of the invention, use of the tray part by the passengers sitting on the right and left side seats may be further improved when the center seat is slid in a backward direction until it reaches a position where the front end portion of the tray part, after inversion of the front divided member, aligns with the front end portion of the pair of the side seats. Also, the front divided member of the center seat in a front rotated state does not interfere, for example, when passengers switch their seats between the right and left side seats.

A fourth aspect of the present invention provides a seat structure for a vehicle as set forth in any one of the first to third aspects of the invention, further comprising: a second box container (for instance, a second box container 67, explained in the following embodiment) disposed below the first box container, the second box container having an open top which is opened/closed by a bottom structure member (for instance, a bottom structure member 46 explained in the following embodiment) forming a bottom surface of the first box container.

According to the above seat structure for a vehicle of the fourth aspect of the invention, a storing space for a vehicle is increased since the second box container is provided below the first box container and is readily used by opening the bottom structure member which forms the bottom surface of the first box container.

A fifth aspect of the present invention provides a seat structure for a vehicle as set forth in any one of the first to fourth aspects of the invention, wherein the center seat includes a seat back (for instance, a seat back 18, explained in the following embodiment) which is formed to be capable of being brought down in a forward direction so as to cover the opening of the first box container, and a second tray part (for instance, a tray part 76, explained in the following embodiment) is provided on an upper surface (for instance, an upper surface 75, explained in the following embodiment), after being brought down, of the seat back.

According to the above seat structure for a vehicle of the fifth aspect of the invention, the seat back of the center seat may be used as a cover member for covering the opening of the first box container when it is brought down in a forward direction in a rotated state of the front divided member. Also, since the tray part is disposed on the upper surface of the brought-down seat back, the passenger/driver sitting on the right and left side seats can use the seat back of the center seat as a tray.

A sixth aspect of the present invention provides a seat structure for a vehicle as set forth in any one of the first to fifth aspects of the invention, wherein the center seat includes a seat back which is formed to be capable of being brought down in a forward direction so as to cover the opening of the first box container, and an armrest portion (for instance, an armrest portion 80 explained in the following embodiment) is provided on an upper surface, after being brought down, of the seat back.

According to the above seat structure for a vehicle of the sixth aspect of the invention, the seat back of the center seat may be used as a cover member for covering the opening of the first box container when it is brought down in a forward direction in a rotated state of the front divided member. Also, since the armrest portion is disposed on the upper surface of the brought-down seat back, the passenger/driver sitting on the right and left side seats can use the seat back of the center seat as an armrest.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, the seat structure of a vehicle according to embodiments of the present invention will be described with reference to the accompanying drawings. Note that the words "front", "back (rear)", "right", and "left" used in the following explanation mean "front", "back (rear)", "right", and "left" with respect to the body of a vehicle.

The seat structure for a vehicle according to this embodiment of the present invention is applied to a three-person seat structure including a pair of side seats which are disposed at the right and left sides of the vehicle and a center seat which is disposed between the side seats, and to a front row of such seats among the front and rear row seats. Note that the present invention may also be applied, for example, only to the rear seat, or both the front and the rear seats as well as to a four or more-person seat structure.

Figure 1:
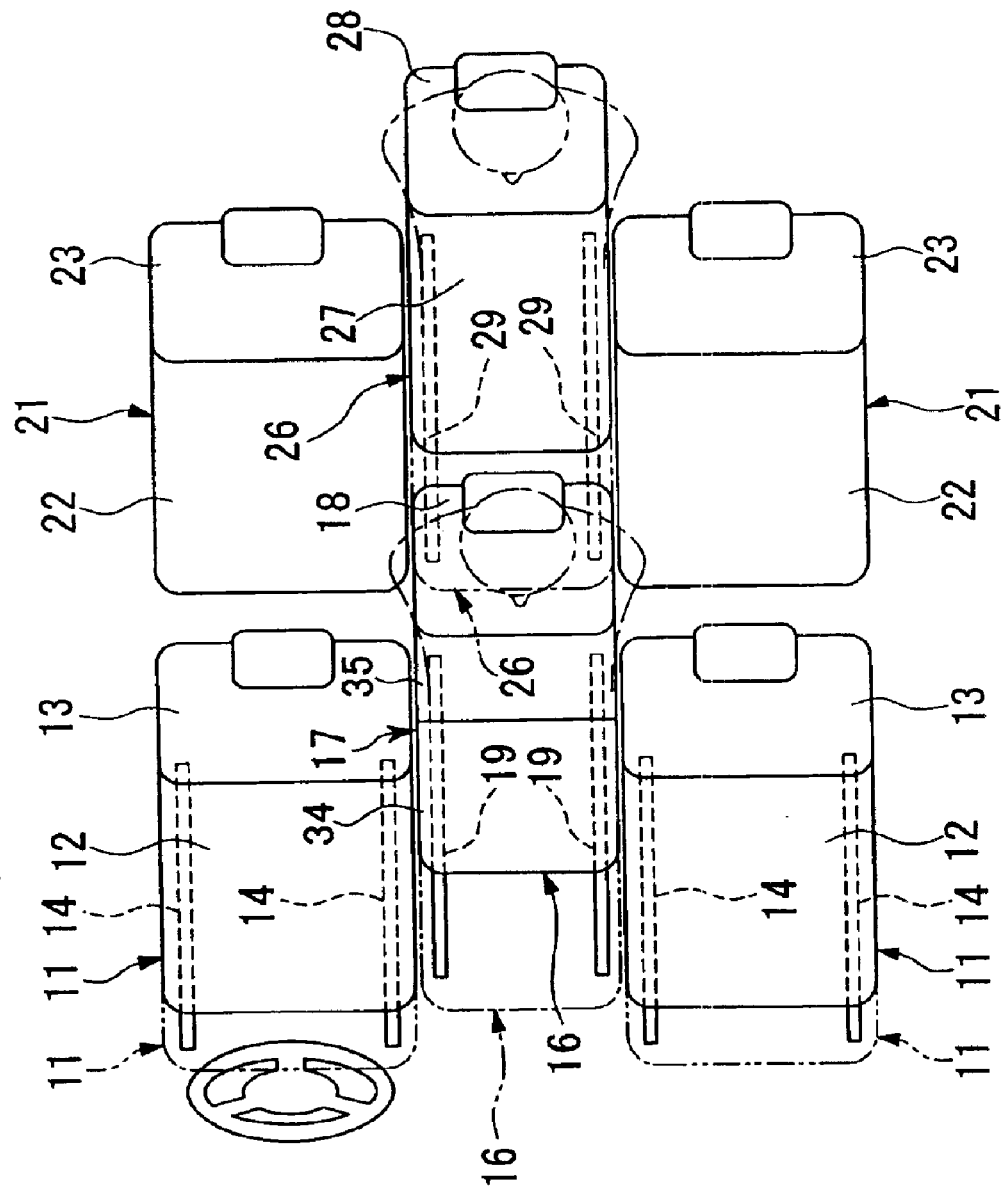
FIG. 1 is a diagram showing a plan view of an interior of a vehicle to which a seat structure according to an embodiment of the present invention is applied.

As shown in FIG. 1, each of a pair of right and left side seats 11 at the front row includes a seat cushion 12 and a seat back 13 attached to the rear end of the seat cushion 12. Also, each of the side seats 11 is disposed so as to be slidable in the back and forth direction, independently to each other, by means of a slide mechanism 14 which is placed below the seat cushion 12. Note that the slidable range of each of the side seats 11 by the slide mechanism 14 is the same as the other.

A center seat 16 which is disposed between the side seats 11 at the front row has a width in the right and left direction narrower than that of each of the side seats 11. The center seat 16 includes a seat cushion 17 and a seat back 18 attached to the rear end of the seat cushion 17. Also, the center seat 16 is disposed so as to be slidable in the back and forth direction by means of a slide mechanism 19 which is placed below the seat cushion 17. Note that a part of the slidable range in the back and forth direction of the center seat 16 by means of the slide mechanism 19 is superimposed with that of each of the side seats 11 by the slide mechanism 14, and the rest of the slidable range of the center seat 16 is shifted backward in a predetermined distance with respect to the slidable range of the side seats 11. Also, the slidable range of the center seat 16 by the slide mechanism 19 is set to be larger than that of the side seats 11 by means of the slide mechanism 14.

More specifically, as indicated by double-dotted chain lines shown in FIG. 1, when each of the pair of side seats 11 is located at the respective front end position by means of the slide mechanism 14 and the center seat 16 is located at the front end position by means of the slide mechanism 19, the center seat 16 is located backward with respect to the pair of the side seats 11 at a predetermined distance so as to form a V-shape layout.

Figure 2:
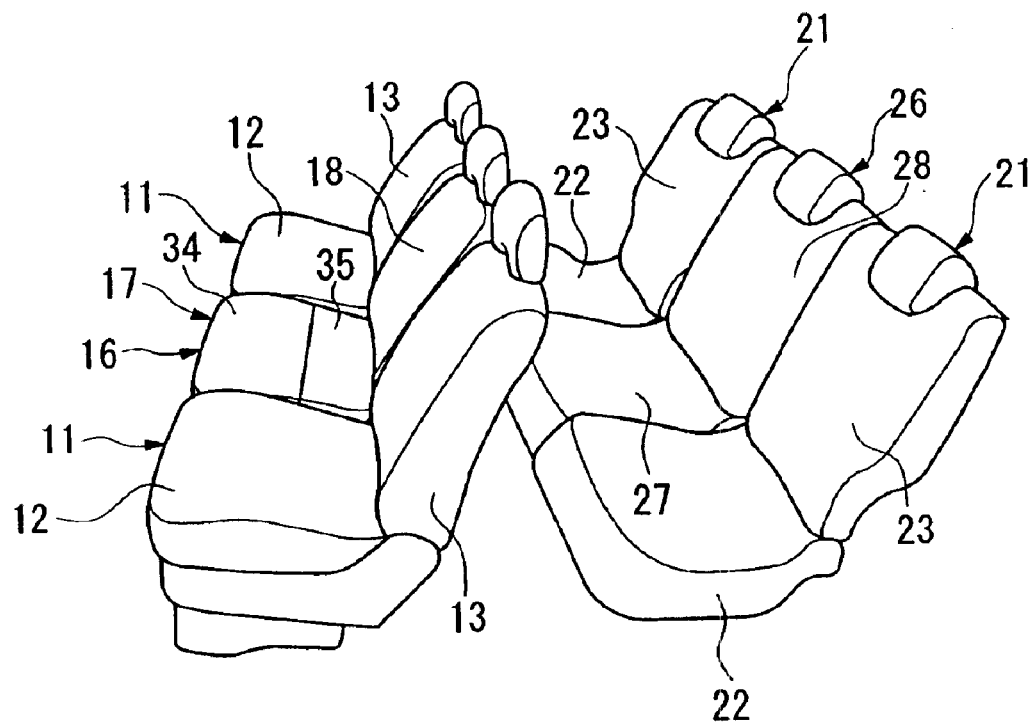
FIG. 2 is a diagram showing a perspective view of a state of an interior of a vehicle to which the seat structure according to an embodiment of the present invention is applied.

Also, when each of the side seats 11 is located at the respective rear end position by means of the slide mechanism 14 as indicated by the solid lines shown in FIG. 1, and the center seat is located at the front end position by means of the slide mechanism 19 by means of the slide mechanism 19 as indicated by double-dotted chain lines shown in FIG. 1, a straight line layout is formed in which the front and rear ends of the side seats 11 and the center seat 16 are aligned as also shown in FIG. 2.

Moreover, when each of the side seats 11 is located at the front end position by means of the slide mechanism 14 as indicated by the double-dotted chain lines shown in FIG. 1 and the center seat 16 is located at the rear end position by means of the slide mechanism 19 as indicated by the solid line shown in FIG. 1, the center seat 16 is located backward with respect to the pair of the side seats 11 in a predetermined distance so as to form a V-shape layout. In this layout, the sliding degree of the center seat 16 by means of the slide mechanism 19 is predetermined so that the shoulders of a passenger sitting on the center seat 16 are completely separated from the shoulders of a passenger sitting on each of the side seats 11 when the reclining angle of the seat back 18 of the center seat 16 is the same as that of the seat back 13 of each of the side seats 11.

Figure 3:
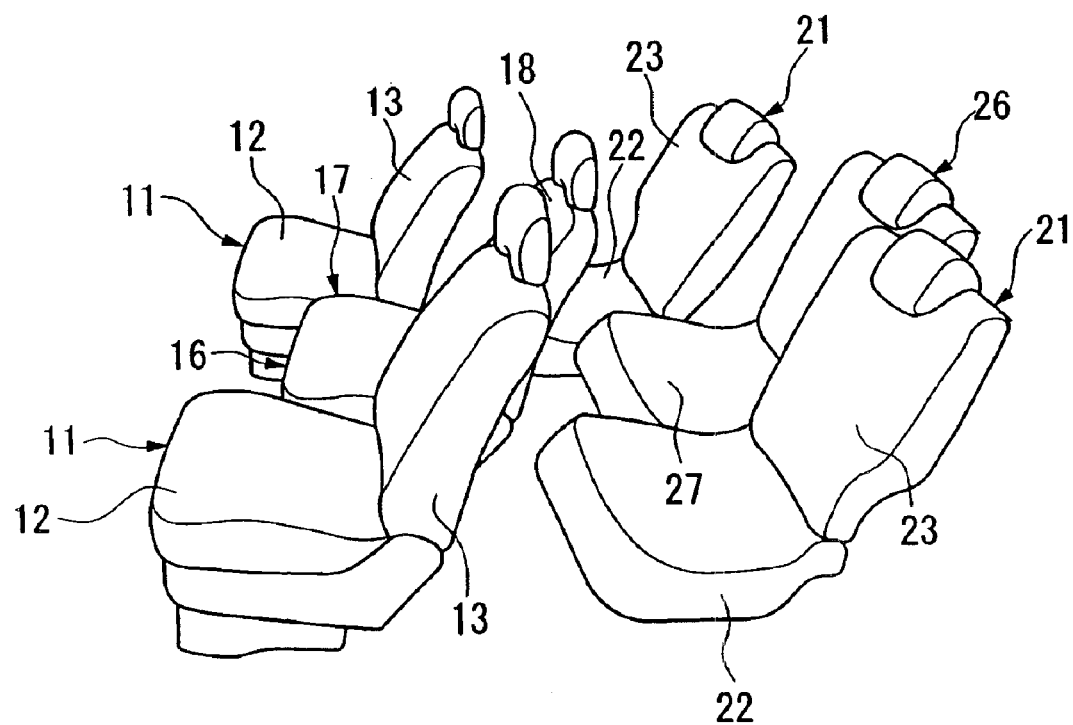
FIG. 3 is a diagram showing a perspective view of another state of an interior of a vehicle to which the seat structure according to an embodiment of the present invention is applied.

Furthermore, when each of the side seats 11 is located at the rear end position by means of the slide mechanism 14 as indicated by the solid lines shown in FIG. 1 and the center seat 16 is located at the rear end position by means of the slide mechanism 19, the center seat 16 is located backward with respect to the pair of the side seats 11 in a predetermined distance so as to form a V-shape layout as also shown in FIG. 3. In this layout also, the sliding degree of the center seat 16 by means of the slide mechanism 19 is predetermined so that the shoulders of a passenger sitting on the center seat 16 are completely separated from the shoulders of a passenger sitting on each of the side seats 11 when the reclining angle of the seat back 18 of the center seat 16 is the same as that of the seat back 13 of each of the side seats 11.

That is, whenever the center seat 16 is located at the rear end position, the shoulders of a passenger sitting on the center seat 16 are always completely separated from the shoulders of a passenger sitting on each of the side seats 11 regardless of the position of the side seats 11.

On the other hand, each of a pair of right and left side seats 21 at the second row includes a seat cushion 22 and a seat back 23 attached to the rear end of the seat cushion 22. The side seats 21 are made so as not to be slidable in the forward and backward direction. Note that the width of each of the side seats 21 in the second row in the right and left direction is made narrower than that of each of the side seats 11 at the first row.

Also, the width of each of the center seat 26 which is disposed between the side seats 21 in the right and left direction, is made narrower than that of each of the side seats 21, and is wider than the width of the center seat 16 at the first row in the right and left direction. In addition, the center position in the right and left direction of the center seat 26 is aligned with the center position in the right and left direction of the center seat 16. The center seat 26 includes a seat cushion 27 and a seat back 28 attached to the rear end of the seat cushion 27, and is disposed so as to be slidable in the back and forth direction, independently, by means of a slide mechanism 29 which is placed below the seat cushion 27. Note that the slidable range of the center seat 26 in the back and forth direction by means of the slide mechanism 29 extends backwardly beyond the rear end position of each of the side seats 21 whose position is fixed.

More specifically, when the center seat 26 is located at the front end position by means of the slide mechanism 29 as indicated by the double-dotted chain lines shown in FIG. 1, a straight line layout is formed in which the front and rear ends of the side seats 21 and the center seat 26 are aligned as also shown in FIG. 2.

Also, when the center seat 26 is located at the rear end position by means of the slide mechanism 29 as indicated by the solid lines shown in FIG. 1, the center seat 26 is located backward with respect to the pair of the side seats 21 in a predetermined distance so as to form a V-shape layout, as is also shown in FIG. 3. In this layout, the sliding degree of the center seat 26 by means of the slide mechanism 29 is predetermined so that the shoulders of a passenger sitting on the center seat 26 are completely separated from the shoulders of a passenger sitting on each of the side seats 21 when the reclining angle of the seat back 28 of the center seat 26 is the same as that of the seat back 23 of each of the side seats 21.

Next, the center seat 16 at the front row will be explained further in detail.

Figure 4:
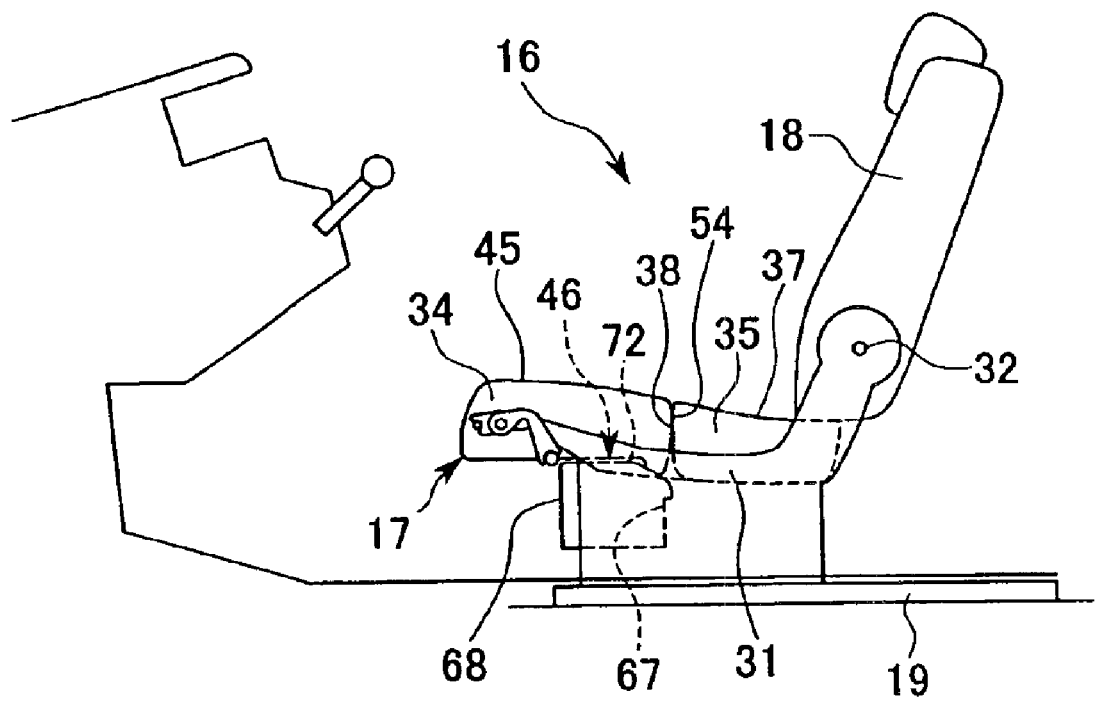
FIG. 4 is a diagram showing a side view of the seat structure for a vehicle and a seating allowance state of a front divided member according to an embodiment of the present invention.

The center seat 16 at the front row is supported by the slide mechanism 19 via a seat frame 31 as shown in FIG. 4, and the seat back 18 is supported by the seat frame 31 via a supporting shaft 32 so that the lower portion thereof becomes rotatable around an axis along the right and left direction. In this embodiment, the seat back 18 is designed so as to be capable of being bent forward until it reaches a substantially horizontal state.

Figure 5:
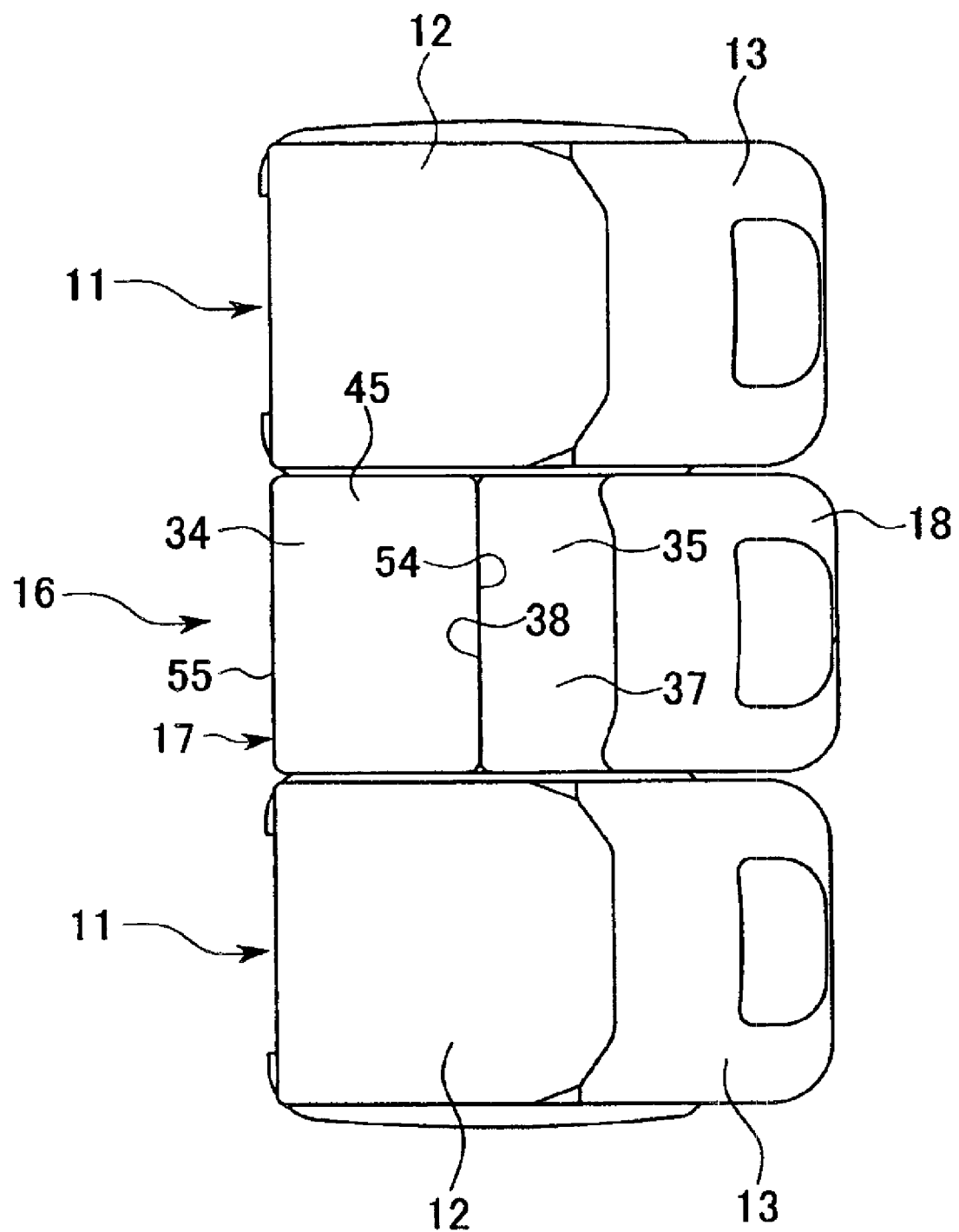
FIG. 5 is a diagram showing a plan view of the seat structure for a vehicle and a seating allowance state of a front divided member according to an embodiment of the present invention.

Also, the seat cushion 17 of the center seat 16 is divided into a front divided member 34 and a rear divided member 35 as shown in FIG. 5. The rear divided member 35 has a substantially rectangular solid shape, and is fixed to the seat frame 31. The rear divided member 35, in its fixing state with the seat frame 31, has a seat surface 37 facing upwardly and a front surface 38 extending along the right and left direction as well as the vertical direction.

Figure 6:
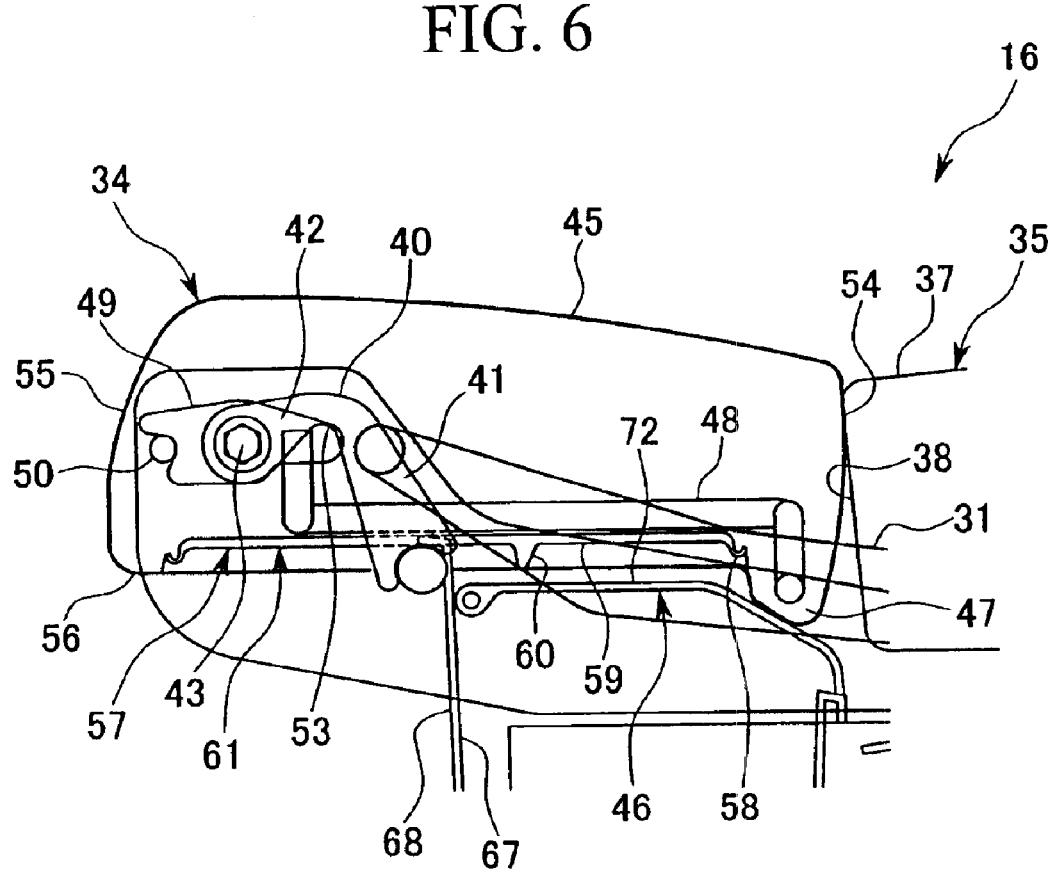
FIG. 6 is a diagram showing an enlarged perspective side view of main portions of the seat structure for a vehicle and a seating allowance state of the front divided member according to an embodiment of the present invention.
Figure 7:
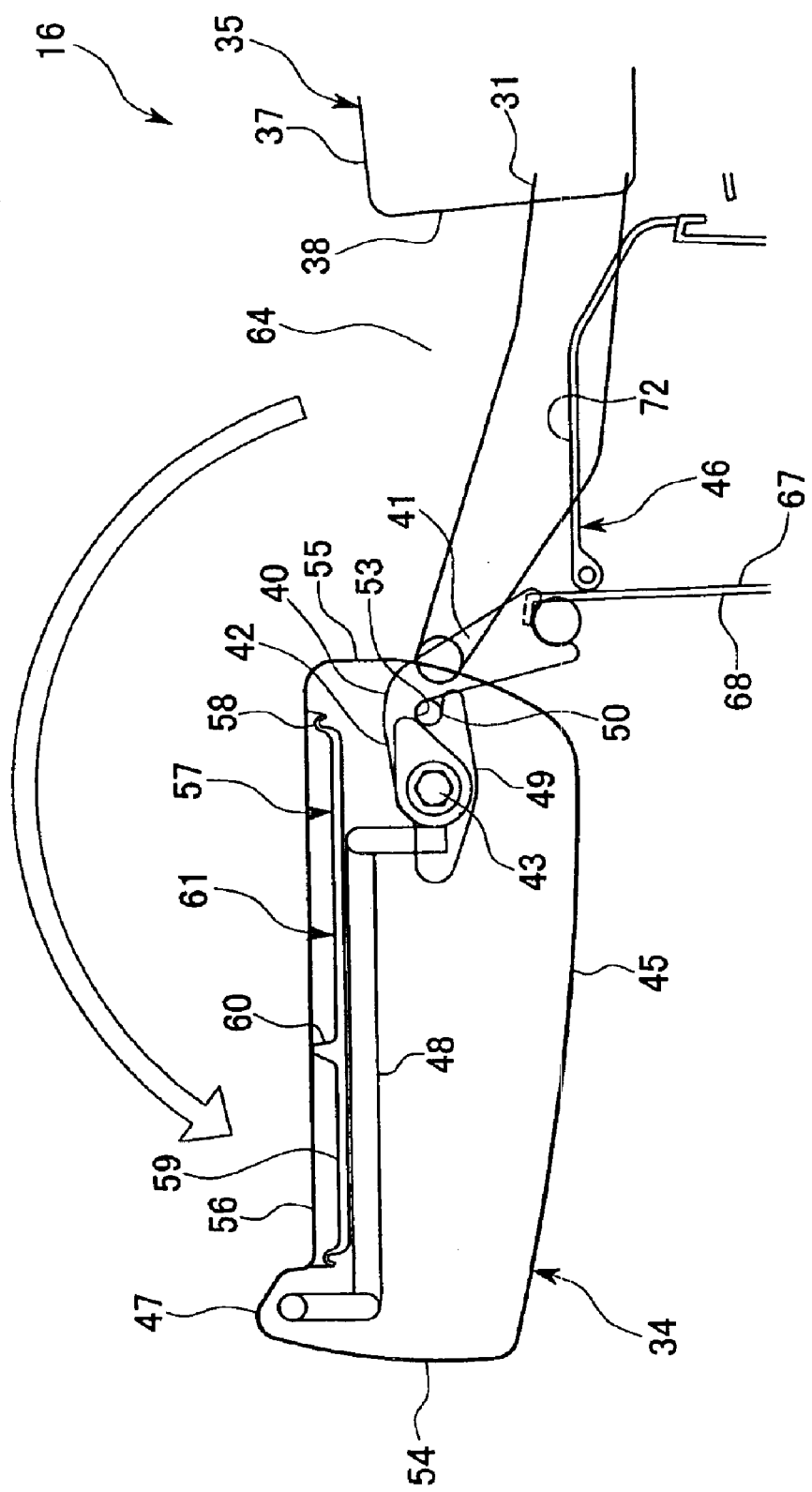
FIG. 7 is a diagram showing an enlarged perspective side view of main portions of the seat structure for a vehicle and a front rotated state of the front divided member according to an embodiment of the present invention.

The front divided member 34, as shown in FIGS. 6 and 7, is rotatably supported by a fixed side frame 40 which forms a front end portion of the seat frame 31. The fixed side frame 40 includes a first extending portion 41 which extends in an upward direction from its base to an end, and a second extending portion 42 which extends from the end of the first extending portion 41 in a downward direction from its base to an end. The fixed side frame 40 rotatably supports the front divided member 34 around an axis along the right and left direction by means of a rotation support member 43 which is disposed at a front end of the second extending portion 42.

The front divided member 34 has a substantially rectangular solid shape, and a lower rear end thereof is supported, with its seat surface 45 facing an upward direction, by a bottom structure member 46 located below. In this embodiment, an end periphery portion of the front divided member 34, which is supported by the bottom structure member 46, with the seat surface 45 facing upwardly, is a protruding periphery portion 47 which extends in the right and left direction and slightly protrudes downwardly. Also, in this state shown in FIG. 6, the front divided member 34 contacts the rear divided member 35, and makes the seat surface 37 of the rear divided member 35 substantially continuous with the seat surface 45 thereof. That is, for the front divided member 34 and the rear divided member 35, this state becomes a seating allowance state in which the seat cushion 17 is formed and seating of the passengers is allowed.

Note that a reinforcement frame 48 is embedded at the opposite side of the seat surface 45 in the front divided member 34 as shown in FIGS. 6 and 7. Also, a rotary side frame 49 is disposed being fixed to the reinforcement frame 48 at the front end side of the front divided member 34 in the above-mentioned seating allowance state, and a stopper bar 50 is fixed to the rotary side frame 49.

The front end side of the front divided member 34 in the above-mentioned seating allowance state is rotatably supported by the rotation support member 43, and it rotates in a frontward direction around the rotation support member 43, i.e., around an axis extending along the right and left direction, when the rear end portion is pulled up. Then, in an up-and-down inversion state of the front divided member 34 with the seat surface 45 facing downwardly due to rotation, the stopper bar 50 enters a recessed portion 53 located at the boundary between the first extending portion 41 and the second extending portion 42 of the fixed side frame 40, and makes contact with the fixed side frame 40. In this manner, the front divided member 34 is stopped and enters a front rotated state. Note that the lower side of a rear surface 54 of the front divided member 34 in the above-mentioned seating allowance state has a slightly curved shape so that the above-mentioned rotation becomes easy with respect to the front surface 38 of the rear divided member 35.

Also, the rear surface 55, i.e., the front surface in the seating allowance state, of the front divided member 34 in a front rotated state after the rotation, extends along the right and left direction as well as the vertical direction.

Figure 8:
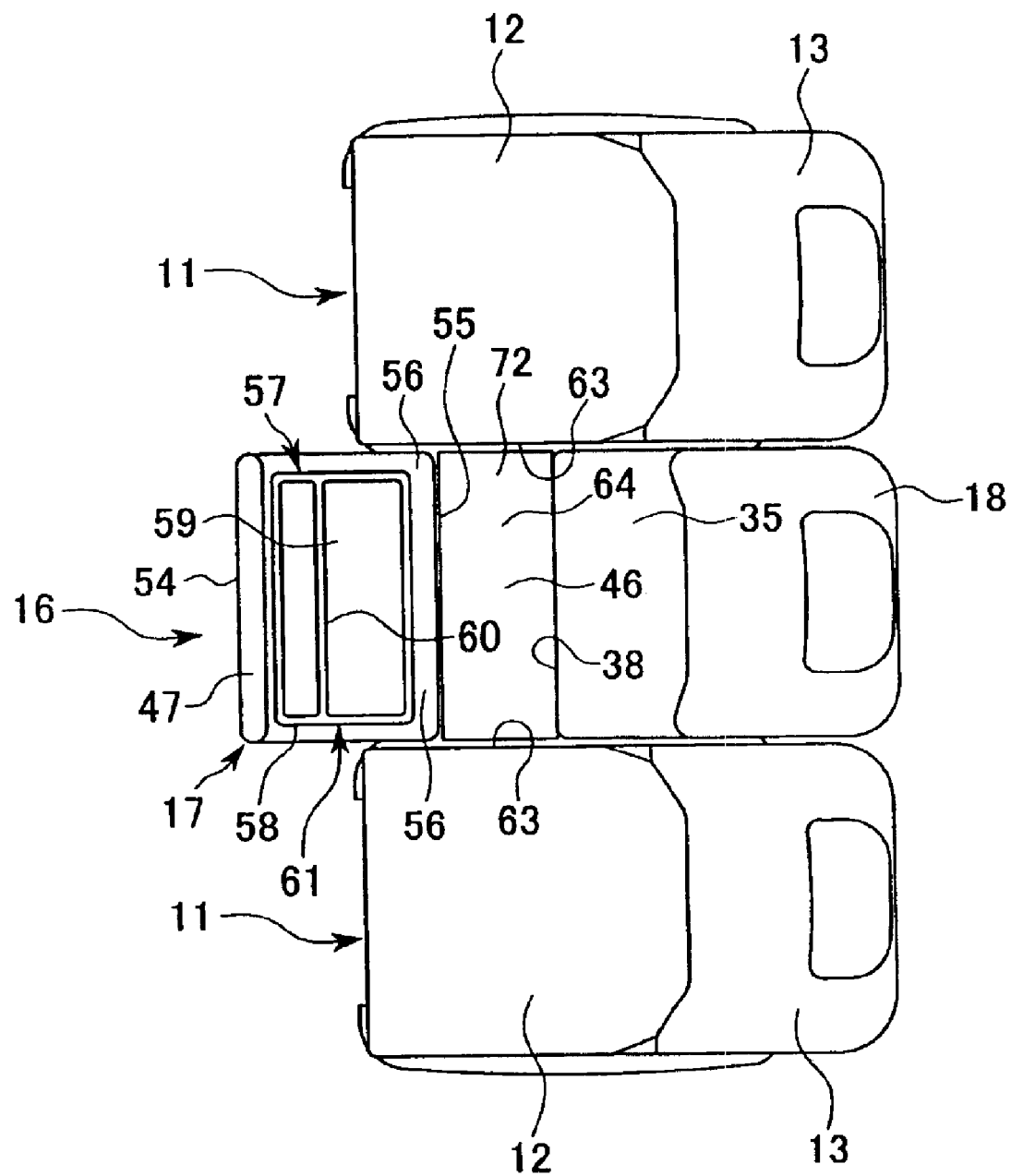
FIG. 8 is a diagram showing a plan view of the seat structure for a vehicle, a front rotated state of the front divided member, and a closed state of a bottom structure member according to an embodiment of the present invention.

As shown in FIGS. 7 and 8, a tray part 57 is disposed on an upper surface 56, i.e., an upper surface after the up-and-down inversion, of the front divided member 34 in a front rotated state. That is, a tray member 61 having a shape formed by a periphery protruding portion 58 slightly protruding in an upward direction, a recessed flat placing surface 59 located inwardly with respect to the periphery protruding portion 58, and a parting portion 60 slightly protruding in an upward direction from the placing surface 59, is embedded in the upper surface 56 side of the front divided member 34 which appears in the front rotated state. Accordingly, the upper surface side of the tray member 61, i.e., the periphery protruding portion 58, the placing surface 59, and the parting portion 60, forms the tray part 57.

Figure 9:
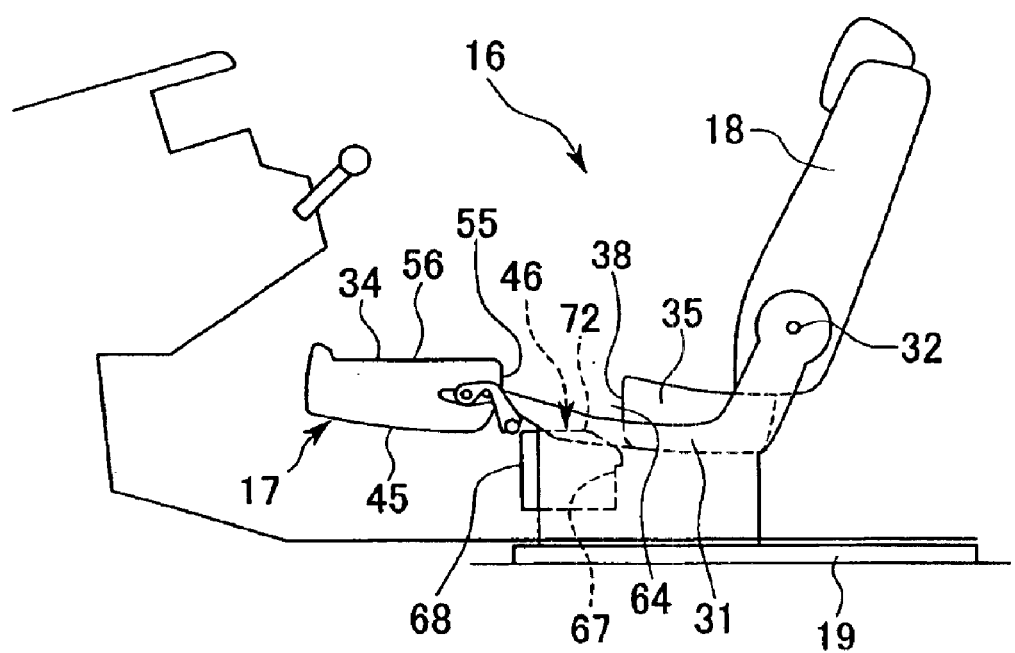
FIG. 9 is a diagram showing a side view of the seat structure for a vehicle, a front rotated state of the front divided member, and a closed state of the bottom structure member according to an embodiment of the present invention.
Figure 10:
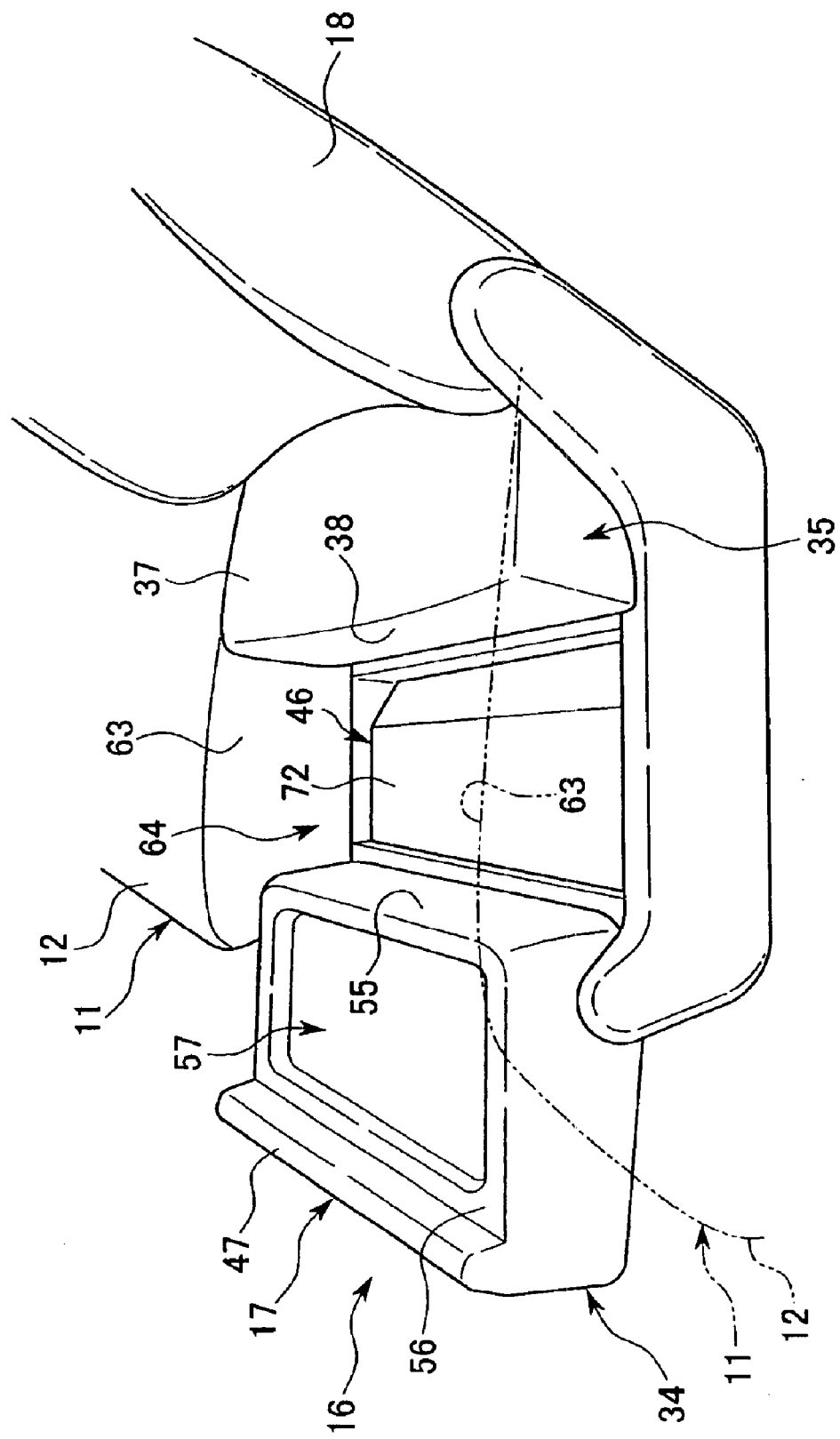
FIG. 10 is a diagram showing a perspective view of the seat structure for a vehicle, a front rotated state of the front divided member, and a closed state of the bottom structure member according to an embodiment of the present invention.

Also, in the front rotated state, a box container 64 having a top opening is formed by the rear surface 55 of the front divided member 34, the front surface 38 of the rear divided member 35, and the side surface 63 at the center seat 16 side of the seat cushion 12 of each of the pair of the side seats 11, as shown in FIGS. 8–10, surrounding all horizontal directions. That is, the rear surface 55 of the front divided member 34 in the front rotated state extends along the right and left direction as well as the vertical direction, the front surface 38 of the rear divided member 35 faces the rear surface 55 of the front divided member 34 in a substantially parallel manner, and the side surface 63 of each of the pair of side seats 11 located at right and left hand sides extend along the back and front direction as well as the vertical direction, these form a rectangular frame shape, and as a result, the box container having a top opening is formed inside thereof.

The bottom of the above-mentioned box container 64 is formed by the bottom structure member 46 of a plate shape disposed at a position where it is covered by the front divided member 34 when the front divided member 34 is in the seating allowance state and is exposed when the front divided member 34 is in the front rotated state.

Figure 11:
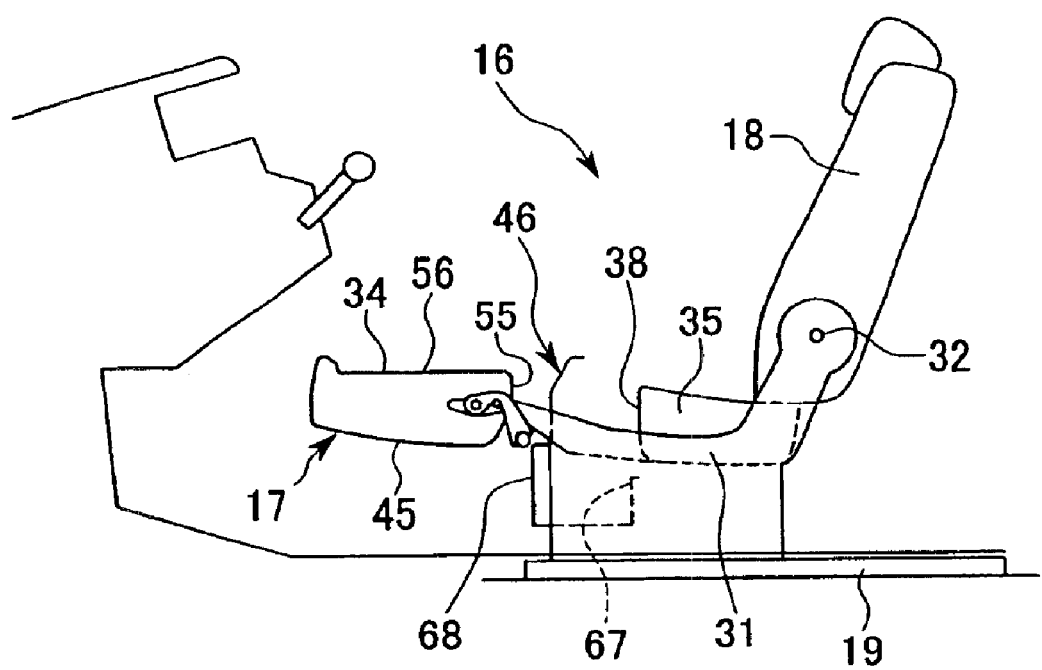
FIG. 11 is a diagram showing a side view of the seat structure for a vehicle, a front rotated state of the front divided member, and an opened state of the bottom structure member according to an embodiment of the present invention.
Figure 12:
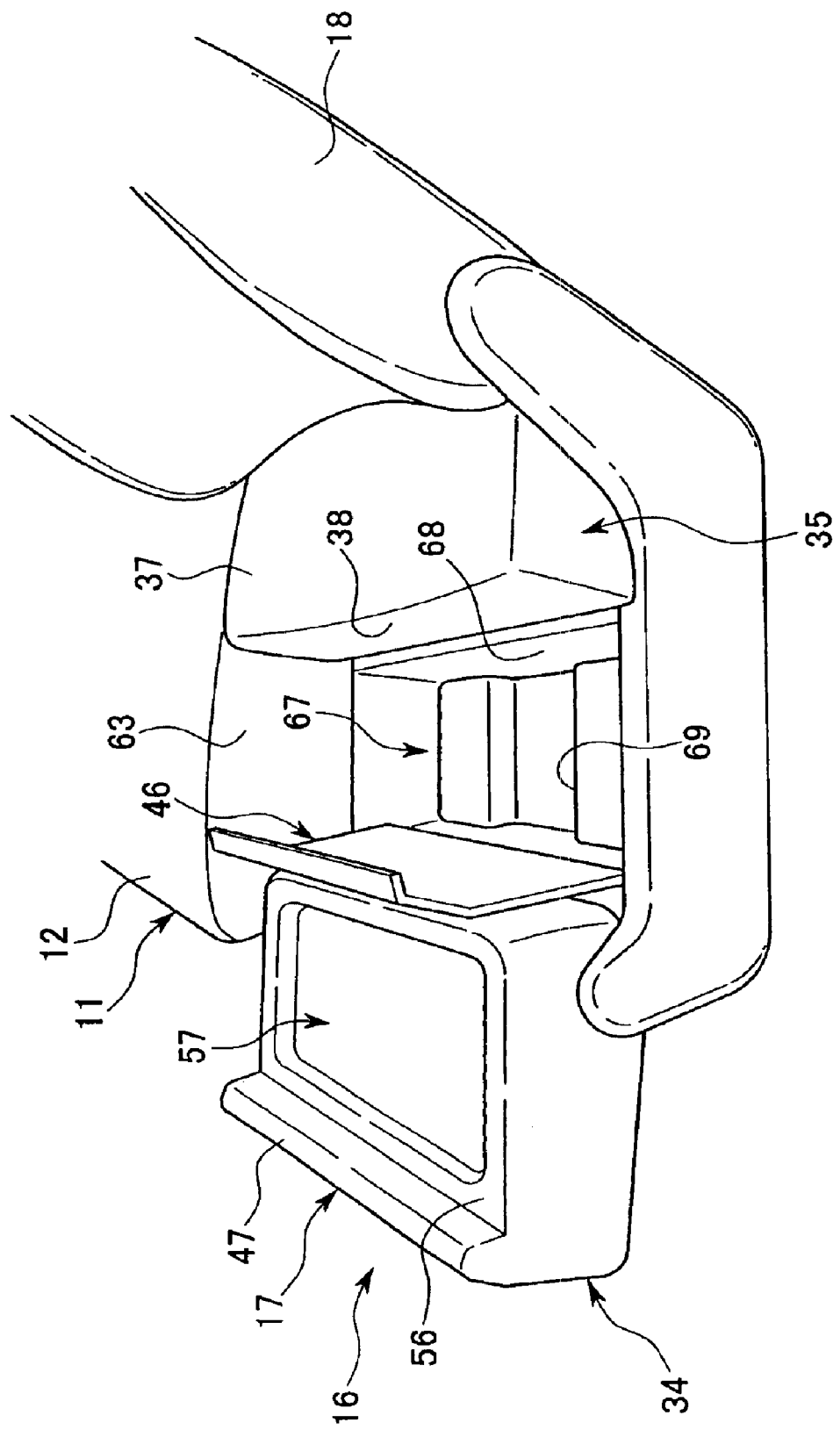
FIG. 12 is a diagram showing a perspective view of the seat structure for a vehicle, a front rotated state of the front divided member, and an opened state of the bottom structure member according to an embodiment of the present invention.

A box member 68 which forms a second box container 67 having a top opening that may be opened and closed by the bottom structure member 46, is fixed to the seat frame 31 located below the bottom structure member 46. A front end periphery portion of the bottom structure member 46 is supported at an upper and front position of the box member 68 so as to be rotatable around an axis extending in the right and left direction, and it is engaged so as to extend in a substantially horizontal direction to cover the upper opening of the second box container 67 as shown in FIGS. 8–10 while it opens the upper opening of the second box container 67 when rotated around the front end portion so as to extend in a substantially vertical direction as shown in FIGS. 11 and 12. In this embodiment, an opening/closing handle means (not shown in the figures) is provided with the bottom structure member 46. Note that a recess portion 69 is provided at substantially the center in the right and left direction of the bottom of the second box container 67.

The upper surface of the bottom structure member 46 may function as a placing surface 72 on which articles, etc., to be placed/stored in the box container 64 may be located.

Figure 13:
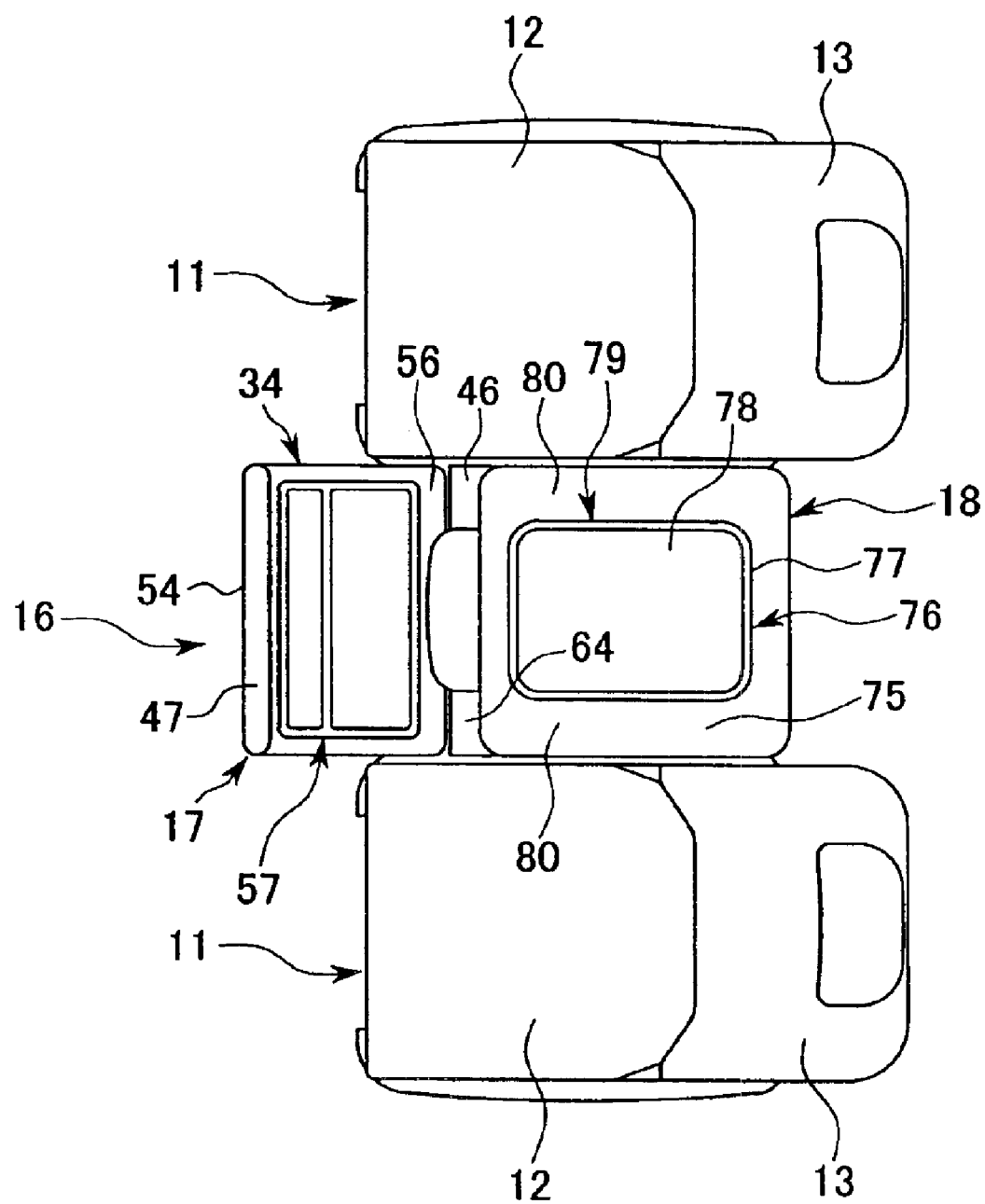
FIG. 13 is a diagram showing a plan view of the seat structure for a vehicle, a front rotated state of the front divided member, and a front brought-down state of a seat back according to an embodiment of the present invention.
Figure 14:
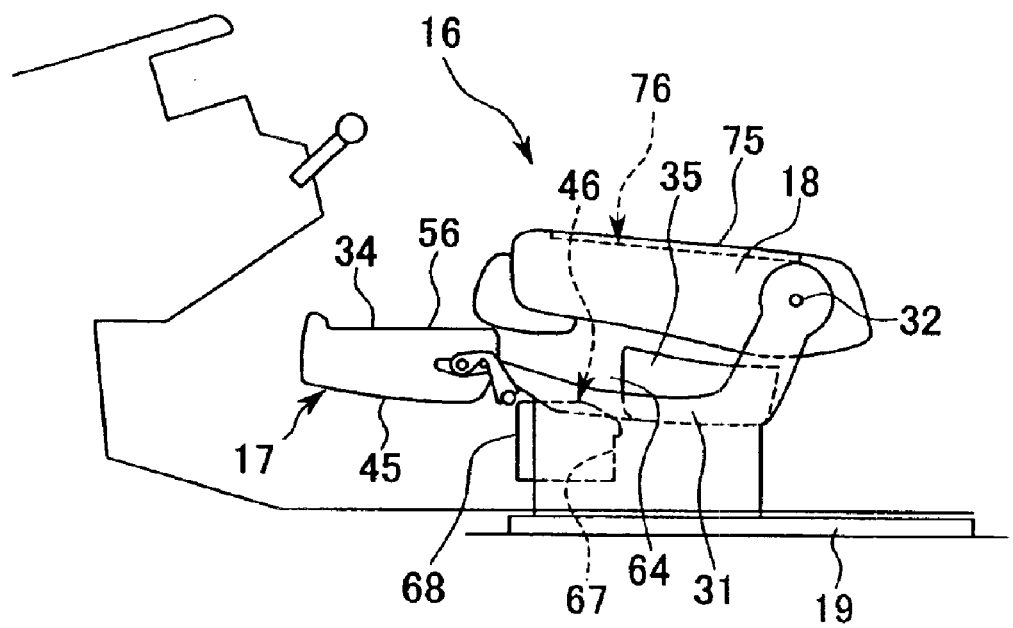
FIG. 14 is a diagram showing a side view of the seat structure for a vehicle, a front rotated state of the front divided member, and a front brought-down state of the seat back according to an embodiment of the present invention.

As shown in FIGS. 13 and 14, the seat back 18 of the center seat 16 may be brought down in a forward direction so as to cover the opening of the box container 64 from the above when it is brought down to a limit position in the front rotated state of the front divided member 34 by which the box container 64 is exposed. Note that the height of the seat back 18 is designed so that it does not cover the tray part 57 of the front divided member 34 in the front rotated state when it is brought down forwardly as shown in FIG. 13.

Figure 15:
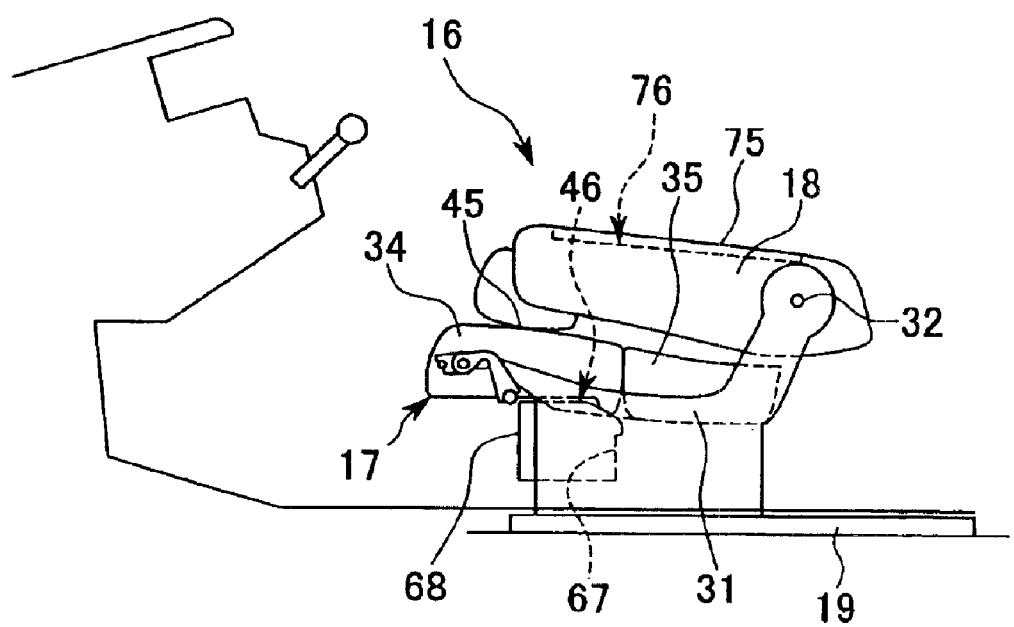
FIG. 15 is a diagram showing a side view of the seat structure for a vehicle, a seating allowance state of the front divided member, and a front brought-down state of the seat back according to an embodiment of the present invention.

Also, a tray part 76 is disposed on the back of the seat back 18 which becomes an upper surface 75 of the seat back 18 in a front brought-down state. That is, a tray member 79 having a shape formed by a periphery protruding portion 77 slightly protruding in an upward direction and a recessed flat placing surface 78 located inwardly with respect to the periphery protruding portion 77, is embedded in the upper surface 75 side of the seat back 18 in the front brought-down state. Accordingly, the periphery protruding portion 77 together with the placing surface 78 form the tray part 76. Also, an armrest portion 80 extending in the back and front direction is provided at the right and left hand side of the tray part 76 of the seat back 18. Note that the tray part 76 and the armrest portions 80 may be suitably used if the seat back 18 is brought down in a forward direction even when the front divided member 34 is in the seating allowance state as shown in FIG. 15.

According to the seat structure for a vehicle of the present invention explained above, the state of the front divided member 34 of the seat cushion 17 is adjusted to be in the seating allowance state, as shown in FIGS. 4 and 5, when a passenger is sitting on the center seat 16. That is, the front divided member 34 is placed on the bottom structure member 46 to contact the rear divided member 35 so that the seating surface 37 of the rear divided member 35 is substantially continuous with the seating surface 45 of the front divided member 34.

Figure 16:
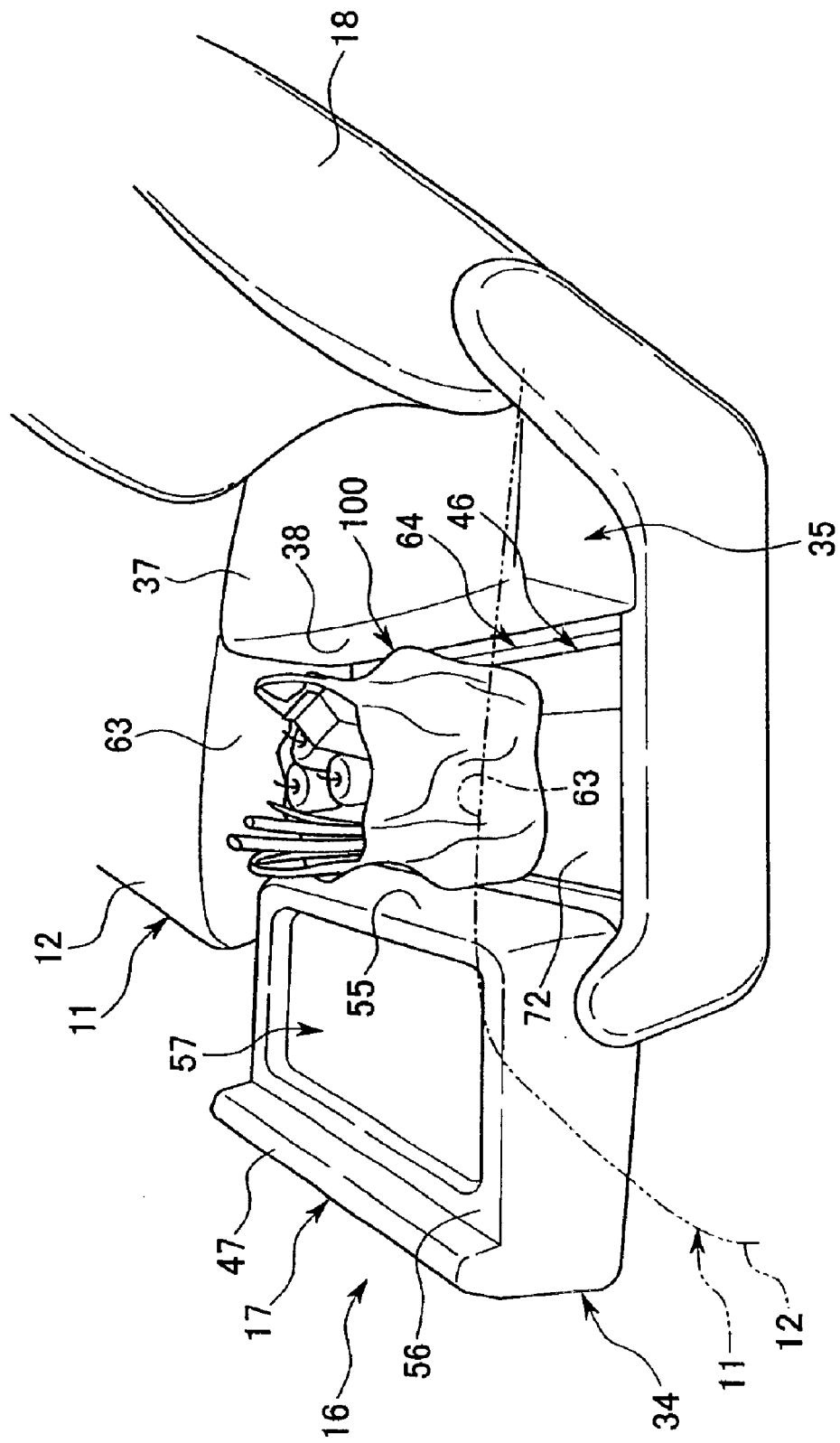
FIG. 16 is a diagram showing a perspective view of the seat structure for a vehicle, a front rotated state of the front divided member, and a state in which articles are placed in a closed state of the bottom structure member according to an embodiment of the present invention.

On the other hand, when a passenger is not seated on the center seat 16 and things such as bags are to be placed thereon, the rear end portion of the front divided member 34 is pulled up and rotated in a front direction around the front end thereof so that the stopper bar 50 of the front divided member 34 makes contact with the fixed side frame 40 to enter a front rotated state as shown in FIG. 7. Then, the box container 64 with an opened top, which is surrounded in all horizontal directions by the rear surface 55 of the front divided member 34, the front surface 38 of the rear divided member 35, and the side surface 63 of the pair of side seats 11 at the center seat 16 side, appears as shown in FIGS. 8–10. At that time, the bottom structure member 46 which forms the bottom portion of the box container 64 is engaged with the box member 68 so that the placing surface 72 faces upwardly. As shown in FIG. 16, when bag 100 is placed on the placing surface 72, the bag 100 is surrounded by the above-mentioned rear surface 55, the front surface 38, and the side surfaces 63 so as to be stably placed thereon. Accordingly, even when an unstable bag 100 in which a plurality of articles having non-uniform shape are put in a flexible sack, for example, is placed on the placing surface 72, and a load is applied from the front, back, right, or left side of the bag 100 as the vehicle runs, it becomes possible to prevent the bag from falling down and the articles inside from spilling out.

Also, as mentioned above, according to an embodiment of the present invention, it is only necessary to rotate the front divided member 34 in order to form the box container 64 for placing bags, etc., and it is not necessary to remove the seat cushion 17 each time. Accordingly, it is possible to readily form the box container 64. Moreover, since the right and left side surfaces of the box container 64 are formed using the side surfaces 63 of the right and left side seats 11, it becomes possible to increase the width thereof as compared with a case where the right and left side surfaces are formed using a part of the seat cushion 17 of the center seat 16. Accordingly, the size of the box container 64 can be increased.

Furthermore, in the above-mentioned front rotated state of the front divided member 34, the front divided member 34 is inverted upside down so that the tray part 57 is located on the upper surface 56. Thus, passenger/driver sitting on the right and left side seats 11 can use the front divided member 34 of the center seat 16 as a tray. Accordingly, it becomes possible to effectively use the front divided member 34 of the center seat 16 as a tray.

Figure 17:
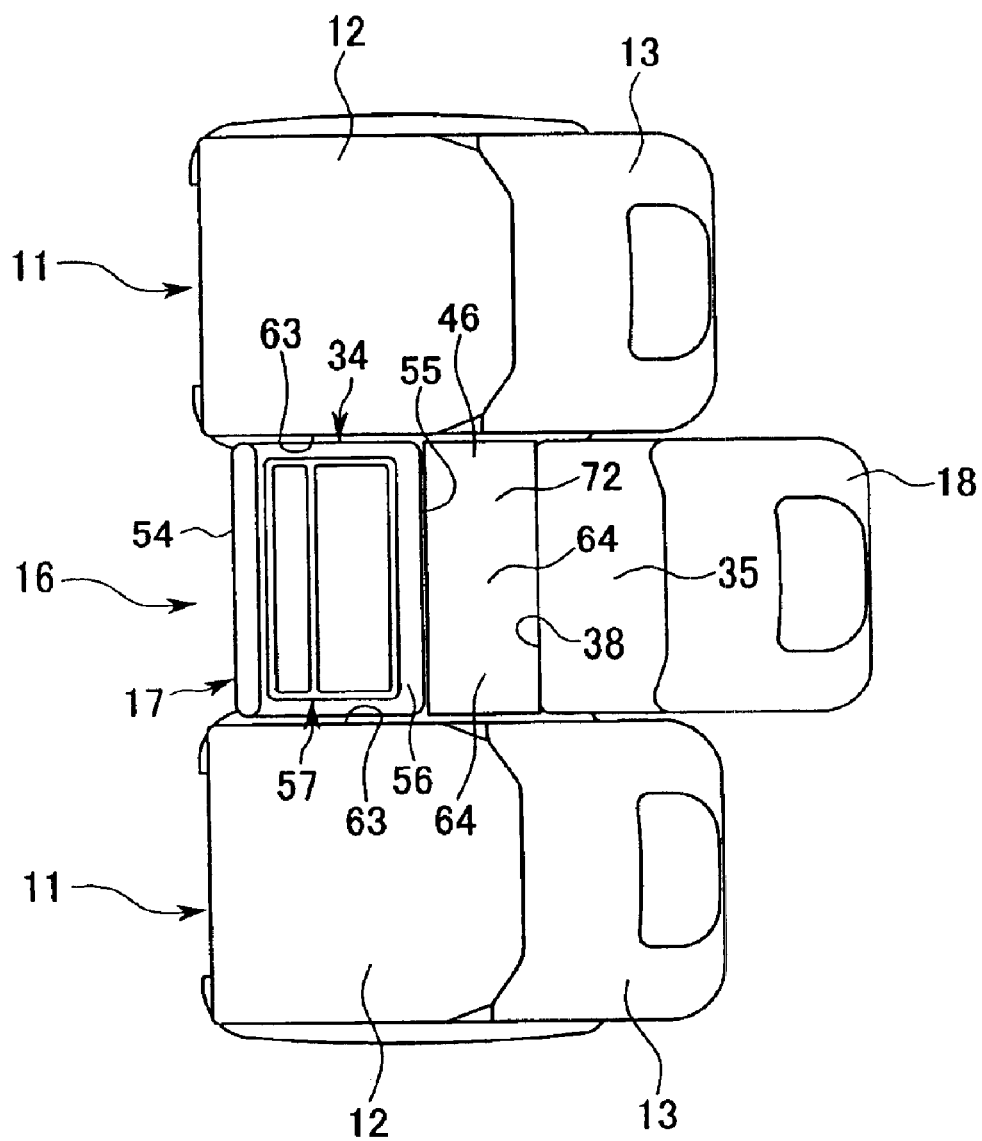
FIG. 17 is a diagram showing a plan view of the seat structure for a vehicle, and a state in which the front divided member is in a front rotated state, side seats are placed at the front limit position, and a center seat is stopped at a suitable position according to an embodiment of the present invention.

In this embodiment, for example, in a state where the right and left side seats 11 are placed at the front limit position, when the center seat 16 in a front rotated state of the front divided member 34 is moved in a backward direction to a suitable position, the front end portion of the front divided member 34 will be located backward with respect to the front end portion of each of the pair of side seats 11 as shown in FIG. 17. As a result, the front end portion of the tray part 57 is also located backward with respect to the front end portion of each of the pair of the side seats 11.

Figure 18:
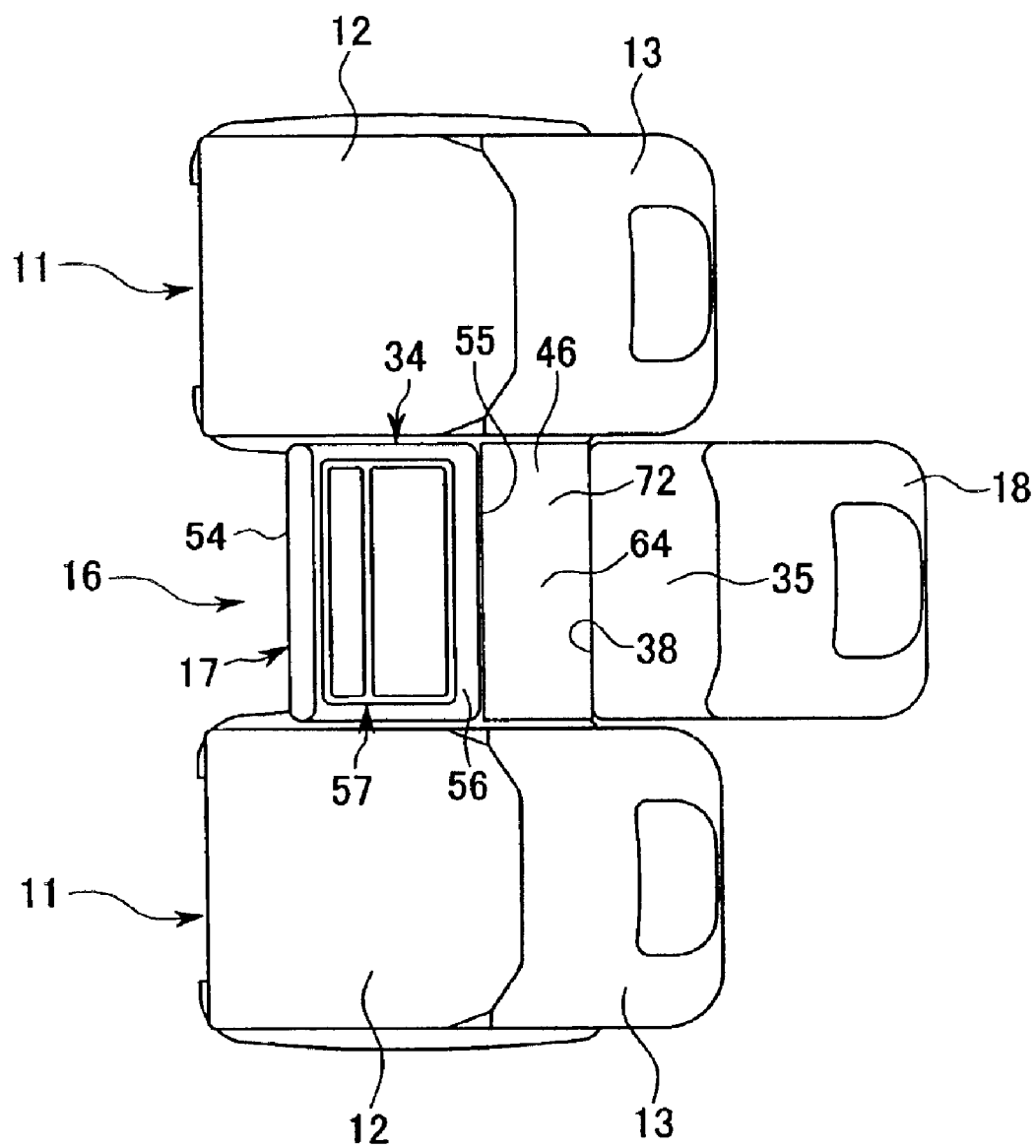
FIG. 18 is a diagram showing a plan view of the seat structure for a vehicle, and a state in which the front divided member is in a front rotated state, the side seats are placed at the rear limit position, and the center seat is also placed at the rear limit position.

As shown in FIG. 18, even if the side seats 11 are located at the rear limit position, the front end portion of the front divided member 34 is aligned with the front end portion of each of the pair of side seats 11 before the limit position thereof (the position shown in FIG. 18) when the center seat 16 in the front rotated state of the front divided member 34 is slid backwardly. As a result, the front end portion of the tray part 57 is aligned with the front end portion of each of the pair of the side seats before the above-mentioned position.

That is, the slide range of the center seat 16 by means of the slide mechanism 19 is set so that the front end portion of the tray 57 of the front divided member 34 in the front rotated state may be moved backwardly beyond a position where it aligns with the front end portion of the side seats 11 located at any possible position. Therefore, the tray part 57 of the front divided member 34 may be placed closer to the passenger/driver sitting on the right and left side seats 11 when the center seat 16 is slid backward. As a result, the passengers sitting on the side seats 11 can use the tray part 57 in a more convenient manner. Note that the convenience in use of the tray part 57 by the passengers sitting on the side seats 11 may be further improved if the center seat is set to be slid backward so that at least the front end portion of the tray part 57 of the front divided member 34 in the front rotated state is aligned with the front end portion of the side seats 11.

Also, since the slide range of the center seat 16 by means of the slide mechanism 19 is set to be the above-mentioned range, it becomes possible for the front end portion of the front divided member 34 in the front rotated state to not protrude from the side seats 11 regardless of the position of the right and left side seats 11. Accordingly, the front divided member 34 of the center seat 16 in the front rotated state does not interfere, for example, when passengers switch their seats between the right and left side seats 11.

Moreover, when equipment such as one that is usually kept in a vehicle is stored in a vehicle, for example, the bottom structure member 46 which forms the bottom of the box container 64 is opened in the front rotated state of the front divided member 34 so that the second container box having an opened top which is disposed below is exposed. Then, after the equipment is put in the second container box 67, the bottom structure member 46 is closed. Accordingly, since the second box container 67 is provided in the embodiment of the present invention, it becomes possible to increase the storing space of a vehicle.

Furthermore, if necessary, the seat back 18 may be used as a cover member for covering the upper opening of the box container 64 by bringing down the seat back 18 in a forward direction as shown in FIGS. 13 and 14 for the case where the front divided member 34 is in the front rotated state and no articles are present in the box container 64 or articles are placed in the box container 64 so as not to protrude from the container 64. In addition, since the tray part 76 is placed on the upper surface 75 of the seat back 18 in a front brought-down state, the passenger/driver sitting on the side seats 11 may use the seat back 18 of the center seat 16 as a tray. That is, the seat back 18 of the center seat 16 may be effectively used as a tray. At that time, since the tray part 57 of the front divided member 34 is also exposed, the two tray parts 57 and 76 may be used at the same time. Moreover, since the armrest portion 80 having a width sufficient for resting an arm is provided at the right and left sides of the tray part 76 on the upper surface 75 of the seat back 18, the passenger/driver sitting on the right and left side seats 11 can use the seat back 18 of the center seat 16 as an armrest. That is, the seat back 18 of the center seat 16 can be effectively used as an armrest.

Note that although the front divided member 34 is provided so as to be rotatable in the front direction in the above-mentioned embodiment, it is possible to make the front divided member 34 to be rotatable in the front direction as well as slidable in the backward and forward direction while in the front rotatable state. By adopting such a structure, it becomes possible to adjust the width in the backward and forward direction of the box container 64 depending on the articles put in the box container.

Also, it is possible to make the front divided member 34 to be slidable only in the backward and forward direction (i.e., a horizontal movement) so that the box container 64 may be formed by sliding the front divided member 34 in a forward direction.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A seat structure for a vehicle, comprising:

a pair of side seats disposed at right and left side of the vehicle;

a center seat disposed between the pair of side seats, said center seat including a seat cushion which comprises a front divided member and a rear divided member; and a first box container having an open top, which is formed when said front divided member is moved in a front direction, by a surface of said front divided member, a front surface of said rear divided member, and a side surface of a seat cushion of each of said pair of side seats facing towards said center seat.

2. A seat structure for a vehicle as set forth in claim 1, wherein said front divided member is moved in a front direction by rotating around a front end side of the front divided member so as to be inverted, and a first tray part is provided on an upper surface, after the inversion, of said front divided member.

3. A seat structure for a vehicle as set forth in claim 2, wherein said center seat is slidable in a backward direction within a range including a position where a front end portion of said first tray part after the inversion of said front divided member aligns with a front end portion of said pair of side seats.

4. A seat structure for a vehicle as set forth in claim 1, further comprising:

a second box container disposed below said first box container, said second box container having an open top which is opened/closed by a bottom structure member forming a bottom surface of said first box container.

5. A seat structure for a vehicle as set forth in claim 1, wherein said center seat includes a seat back which is formed to be capable of being brought down in a forward direction so as to cover the opening of said first box container, and a second tray part is provided on an upper surface, after being brought down, of said seat back.

6. A seat structure for a vehicle as set forth in claim 1, wherein said center seat includes a seat back which is formed to be capable of being brought down in a forward direction so as to cover the opening of said first box container, and an armrest portion is provided on an upper surface, after being brought down, of said seat back.

* * * * *